(12) United States Patent
Aull et al.

(10) Patent No.: US 7,805,614 B2
(45) Date of Patent: Sep. 28, 2010

(54) SECURE LOCAL OR REMOTE BIOMETRIC(S) IDENTITY AND PRIVILEGE (BIOTOKEN)

(75) Inventors: Kenneth W. Aull, Fairfax, VA (US); William Gravell, Vienna, VA (US); James B. Rekas, Arlington, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 1131 days.

(21) Appl. No.: 11/094,452

(22) Filed: Mar. 31, 2005

(65) Prior Publication Data

US 2005/0240779 A1   Oct. 27, 2005

Related U.S. Application Data

(60) Provisional application No. 60/564,958, filed on Apr. 26, 2004.

(51) Int. Cl.
G06F 7/04 (2006.01)
G06F 21/00 (2006.01)
H04L 29/06 (2006.01)
H04L 9/32 (2006.01)
H04L 9/00 (2006.01)
H04L 9/08 (2006.01)
H04K 1/00 (2006.01)

(52) U.S. Cl. .............. 713/186; 726/2; 726/7; 713/159; 713/172; 713/173; 713/175; 713/178; 713/181; 713/182; 713/183; 713/184; 713/185; 380/255; 380/259; 380/277; 380/281; 380/282; 380/283; 380/284; 380/285

(58) Field of Classification Search .............. 380/255, 380/259, 277, 281–285; 713/150, 155–159, 713/168–173, 175, 178, 181, 182–186; 726/2–10, 726/16–21

See application file for complete search history.

(56) References Cited

U.S. PATENT DOCUMENTS 4,529,870 A * 7/1985 Chaum ................. 235/380

(Continued)

FOREIGN PATENT DOCUMENTS

WO   WO 01/59686 A1 * 8/2001

OTHER PUBLICATIONS

PGP. "An Introduction to Cryptography," 1998, Network Associates, Inc.*

Primary Examiner—Kimyen Vu
Assistant Examiner—Darren Schwartz
(74) Attorney, Agent, or Firm—Andrews Kurth LLP

(57) ABSTRACT

A method for secure identity processing using biometrics is provided. A public key and a unique serial number are received from a BIOTOKEN. A random number is generated. The random number and the unique serial number are transmitted to the BIOTOKEN. A serial number received from the BIOTOKEN is compared with the unique serial number and if there is a match, an encrypted symmetric key, transmitted by the BIOTOKEN, is decrypted using the public key. An encrypted random number and encrypted biometric data associated with a user are decrypted using the decrypted symmetric key. The decrypted random number is compared with the transmitted random number, if there is a match, the decrypted biometric data is validated and the received serial number and the public key are transmitted to a certification authority if the biometric data is validated. An authentication certificate associated with the BIOTOKEN is issued by the certification authority.

42 Claims, 5 Drawing Sheets

U.S. PATENT DOCUMENTS

| | | | | |
|---|---|---|---|---|
| 5,343,527 | A * | 8/1994 | Moore | 713/179 |
| 5,485,519 | A * | 1/1996 | Weiss | 713/185 |
| 5,790,668 | A * | 8/1998 | Tomko | 713/186 |
| 6,216,230 | B1 * | 4/2001 | Rallis et al. | 713/185 |
| 6,490,680 | B1 * | 12/2002 | Scheidt et al. | 713/166 |
| 6,819,219 | B1 * | 11/2004 | Bolle et al. | 340/5.52 |
| 7,298,851 | B1 * | 11/2007 | Hendricks et al. | 380/282 |
| 7,319,987 | B1 * | 1/2008 | Hoffman et al. | 705/44 |
| 2002/0124176 | A1 * | 9/2002 | Epstein | 713/186 |
| 2002/0186838 | A1 * | 12/2002 | Brandys | 380/30 |
| 2003/0028781 | A1 * | 2/2003 | Strongin | 713/182 |
| 2003/0093663 | A1 * | 5/2003 | Walker | 713/150 |
| 2003/0172280 | A1 * | 9/2003 | Scheidt et al. | 713/182 |
| 2003/0233541 | A1 * | 12/2003 | Fowler et al. | 713/155 |
| 2004/0109568 | A1 * | 6/2004 | Slick et al. | 380/277 |
| 2004/0158708 | A1 * | 8/2004 | Peyravian et al. | 713/156 |
| 2005/0138392 | A1 * | 6/2005 | Johnson et al. | 713/186 |
| 2005/0235148 | A1 * | 10/2005 | Scheidt et al. | 713/168 |

* cited by examiner

SECURE LOCAL OR REMOTE BIOMETRIC(S) IDENTITY AND PRIVILEGE (BIOTOKEN)

REFERENCE TO RELATED APPLICATION

This application claims the benefit of, and incorporates by reference, U.S. Provisional Application No. 60/564,958, filed Apr. 26, 2004.

TECHNICAL FIELD

The present invention relates to identity processing using biometrics. In particular, an embodiment of the present invention provides a secure method and system to initialize, enroll and authenticate a BIOTOKEN and access privileges based on the authenticated BIOTOKEN.

BACKGROUND

The use of biometric(s) to control authentication of identity and privilege is hampered by a lack of trust in the intermediary biometric(s) readers, computers, and wireless or wired communications channels. At any point in the communications, or in the reader itself, security and privacy can be permanently compromised (it is impossible to change one's biometric(s) if the biometric(s) are captured by an unauthorized third party). A relying access system cannot know, using the prior art, if the biometric(s) is in fact being read, in real-time, by the person that nominally exhibits the biometric.

One prior art technology is frequently called "match-on-token". Here, a biometric(s) is collected by the token or externally, during initialization, and the resulting biometric(s) is stored on the card. When a match is required, the biometric(s) is re-sampled by the token and compared on the token. A pass-or-fail comparison of the biometric is thereby computed.

There are serious problems with this prior art.

No token can be made truly physically secure in the hands of a determined attacker. A successful attack yields a copy of the biometric(s) of the owner of the token. Regardless of any encryption, all the necessary data to compare the biometric(s) may be on the token, by definition. Because it is not possible to revoke and change the strong biometric(s) of a user, they end up compromised for life.

A second problem is the "replay attack." The pass-fail signal can be intercepted at any point in the communication path, and simply played back to gain access.

A third attack is that the token can be modified to merely affirm the pass-fail determination, regardless of the biometric(s) read.

Finally, since the biometric(s) is/are contained on the token, there is no natural fallback when the token is lost if a wholly separate mechanism to recover the biometric(s), identity and privileges is not specified.

In an attempt to deal with these problems, the biometric(s) match tends to be moved further and further back in the processing chain. In all these prior art technologies, the weakness remains in the communication channel. Ultimately, the pass-fail may be made in a central server, thereby suffering from scalability problems, and the pass-fail decision is still subject to attack when it is communicated to the relying party.

Many prior art technologies depend on the use of "encryption", in order to protect the data in the communication channel. These ultimately suffer the problems of distribution of the symmetric key. Before the biometric(s) data can be used, the data may be decrypted. If the data can be decrypted, the symmetric key may be available. If the symmetric key is available, it can be attacked, and the same set of vulnerabilities exist. The whole issue of key distribution makes the approach impractical and insecure.

Other prior art technologies depend on the issuance of Public key Infrastructure (PKI) certificates using the X.509 standard or an equivalent. This approach is known as Public/Private key. This solution suffers from many of the same scalability problems. The X.509 and the ANSI X.9 standards incorporate a hash function that generates a unique digital signature from a given data set, and establish that only a trusted Certification Authority (CA) could have signed such a signed certificate. Such digital certificates, although of value in authenticating electronic transactions, fail to authenticate a human transactor, for they only authenticate the possession of the private cryptographic key used in the transaction. Since private keys are physically stored on computers or electronic storage devices, they are not physically related to the entities associated with the keys, but instead may be assigned to a group or organization. Private keys are subject to physical loss, theft, or destruction, since they may be stored on physical media in un-trusted locations, and the locking mechanism protecting such keys can be forgotten. Private keys are, therefore, the fatally weak aspect of the use of digital certificates in conjunction with biometric(s) to perform authentication.

SUMMARY

Embodiments described herein address, in general, the problem of providing local or remote secure access to identity and privileges using two-part authentication, including something you have (token) and something you are (biometric(s)). A specific sub-implementation is called the Biometric Token, or BIOTOKEN. For the purpose of clarity, the BIOTOKEN sub-implementation uses the communication modality of wireless, with the biometric modality of, for example, a single fingerprint from a set of one to ten.

A method for providing secure, remote, two-part authentication, a first part being a trusted biometric(s) reader, and a second part being registered tamper-proof biometric(s) for the party being remotely authenticated. The single trusted biometric(s) reader can be independently trusted by separate relying parties, without any disclosure or loss of privacy inherent in a shared trusted token. This allows authentication to occur at the point of trust of the relying party. Authentication can occur at any point on the communication path, via wireless, or wired communication, with any number of un-trusted relay points, such as the initial computer, or any number of servers in-between. Each of the in-between sites can establish a separate authentication, without collaboration with, or regard for the other relying parties, thus the privacy of the individual is maintained. Any full-duplex communication path, and any biometric(s) modality may be used.

The registration and protection of secure biometric(s) Identities and Privileges may be performed as described in U.S. application entitled "Secure Identity and Privilege System", Ser. No. 10/137,622, which is hereby incorporated by reference. That patent application describes a biometric(s) basis for secure identity and privilege use, based on Public Key Infrastructure. Embodiments described herein provide a process for the remote, secure exercise of identity and privilege over un-trusted, insecure communication paths, wired or wireless.

The BIOTOKEN implementation is a secure, trusted token incorporating a processor, a wireless communication channel, and a strong biometric(s) reader (e.g., a fingerprint reader in the initial implementation). During the manufacturing process, shown in FIG. 1, the BIOTOKEN is initialized. Note that this process can be performed again in the future, to allow reuse of the device. A completely PKI standard public/private asymmetric key pair are generated. The public key, along with the unique serial number of the BIOTOKEN is transmitted locally to the initialization machinery. The machinery contains a Certification Authority, which issues a public X.509 certificate containing the serial number of the device, and the associated public key. This public certificate is stored, for sharing with organization(s) that wish to issue identities and privileges to the holder of the BIOTOKEN. The public certificate is delivered out-of-band to a trusted set of relying parties. It can also be similarly delivered to the holder of the BIOTOKEN.

The BIOTOKEN is individually enrolled into each trust domain. The separation of the domains allows a single token to be used over a large domain space, without compromise of privacy. During the enrollment process, the person, the set of privileges that have been granted to them, the BIOTOKEN serial number, the biometric(s) and the BIOTOKEN public certificate are bound together. This can be achieved weakly, using simple databases, or they can be cryptographically bound, as described in "Secure Identity and Privilege System" and in this implementation. The enrolling authority connects, wirelessly or wired, with the BIOTOKEN. In an embodiment, the BIOTOKEN submits its unique serial number insecurely. The authority uses the serial number to retrieve the token's Public Certificate either out-of-band, or from the holder. The authority creates a large random number of sufficient length to prevent an exhaustion attack (typically, and herein after, referred to as a nonce). The nonce is sent back to the BIOTOKEN along with the serial number of the BIOTOKEN. The BIOTOKEN recognizes its own serial number and proceeds with the following processing. The BIOTOKEN reads the fingerprint (or other biometric(s)), providing liveness checking. The raw or templated biometric(s) is attached to the nonce that was received. The BIOTOKEN computes a random symmetric key, and encrypts the data packet. The symmetric key is encrypted using asymmetric encryption accomplished with the stored private key. The BIOTOKEN serial number is sent along with the asymmetrically encrypted symmetric key, and the symmetric key encrypted biometric(s) and nonce.

In an embodiment, the enrolling station uses the certificate of the BIOTOKEN, that has been looked up using the serial number sent in the previous communication, to guarantee that the BIOTOKEN was initialized by a trusted authority, and that the BIOTOKEN has not been revoked by action taken by the authority in response to the reported loss or theft of the BIOTOKEN. The public key from the public certificate is used to decrypt the symmetric key. The symmetric key is then used to decrypt the biometric(s) and the nonce. If the nonce compares, the authority has received back the expected nonce, generated uniquely by it, and sent in its original communication to the BIOTOKEN, and now sent back signed and encrypted by the now trusted BIOTOKEN. This mechanism prevents replay attacks because every reply is different in a way known only by the authority. The authority now has a sample biometric(s), the identity of the person in front of the authority, the serial number of a trusted reader, and the public certificate of the trusted reader. This can be bound into a trust database, or it can be made securely distributable, for example, by the mechanisms of "Secure Identity and Privilege System".

A relying party can now connect to the trusted biometric(s) reader(s), regardless of the trust status of the network, or intermediary processors. To establish two-part authentication, the relying party asks the holder of the BIOTOKEN to turn it on. As a result, the relying party receives a request for authentication. This is the serial number of the trusted BIOTOKEN. If the serial number is unknown, no trust can be established. If the serial number is known, then a challenge (nonce) is sent, along with the serial number of the BIOTOKEN. The BIOTOKEN receives the nonce and serial number. It will ignore an incorrect serial number or nonce of insufficient length. The biometric(s) reader is enabled, and the biometric(s) is read and checked for liveness. The embodiments described herein do not require a specific method of liveness checking, nor a specific biometric(s) comparison or template method. The biometric, or template of the biometric(s), is assembled with the nonce. The BIOTOKEN computes a random symmetric key and encrypts the biometric(s) and nonce. The symmetric key is encrypted with the private key of the BIOTOKEN, and the serial number and encrypted symmetric key are attached to the packet and transmitted. Note that this method may be similar to the method used during enrollment.

The relying party receives the authentication communication. This is a serial number from the BIOTOKEN, the encrypted biometric(s) and nonce, and the asymmetrically encrypted symmetric key. The relying party uses the serial number to check for a BIOTOKEN it trusts. The serial number is used to look up the certificate of authenticity of the BIOTOKEN, check for expiration or revocation, and then the public key of the token is extracted from the certificate. The public key is used to decrypt the symmetric key. This allows the relying party to decrypt the biometric(s) and the challenge nonce. If the nonce is the same one sent then the packet may have been encrypted by the one BIOTOKEN associated with the certificate and private key of the authorized BIOTOKEN. From the trust database, or the "Secure Identity and Privilege System," the biometric(s) of the holder of the BIOTOKEN is retrieved. This is compared with the decrypted biometric(s) submitted by the BIOTOKEN. If the biometric(s) match correctly, then two-part authentication has occurred. The person, no matter how remote, or over any un-trusted communication path, must be the person issued the BIOTOKEN, and they must be exhibiting the biometric(s) that was registered. No un-trusted listener between the BIOTOKEN and the relying party can observe the contents of the encrypted communications. The decision to grant authorization is made at the point of ownership of the access, not at any place before or after the relying party.

A lost BIOTOKEN contains nothing of value other than the private key. That key is made useless if the BIOTOKEN is reported lost or stolen. The private key itself is useless without the matching biometric(s). There is no identification of the holder of the BIOTOKEN, nor of the biometric(s), since they are not stored there. A single BIOTOKEN can be registered with an unlimited number of identity or privilege domains. Since nothing is ever stored on the BIOTOKEN by the initialization, enrolling or authentication phases, no mechanism for writing to the BIOTOKEN is provided, greatly increasing privacy and security. A lost BIOTOKEN is reported to the authority that initialized the BIOTOKEN, which revokes the x.509 certificate of the BIOTOKEN. Since this revocation list is checked before any enrollment or authentication, hundreds or thousands of authentication domains can be cancelled by declaring the BIOTOKEN lost or stolen. Consequently, two-part authentication is always assured. Note that a BIOTOKEN can be reused at anytime by forcing a re-initialization. Such a re-initialization overwrites the private key, destroying the ability of the BIOTOKEN to operate under its previous trust environment.

The generation of a public/private key pair and the signing of the public key, e.g., into an x.509 certificate, cryptographically bind a BIOTOKEN to its serial number of the device. This is done during the initialization process. The biometric(s) and identity of a user and the association of the user with the BIOTOKEN and its public certificate is independently bound by each separate enrolling authority. Each relying party can remotely handle a request for authentication, by finding that the BIOTOKEN is trusted, and is bound to an identity that should be given access. The relying party issues a challenge, which is returned along with the signed and encrypted biometric(s) from the trusted remote reader. No un-trusted listening device or intermediary processor may intercept the identity of the person, or the biometric(s) of the person. Each individual trust domain has no information about the identity or privileges issued by other trust domains (e.g., one issuer of credit cards has no knowledge of the data held by a competing card issuer, even when both use an interoperable device, designed to a common standard for the purposes of biometrically enabled internet charges). Trust can be established regardless of the number of "hops" between the user and the relying party, using strong, two-part authentication.

As will be seen from the foregoing, embodiments described herein provide a process for personal authentication that allows the grantors of privilege to easily and seamlessly add additional accesses to enhance the security of their privileges without requiring all privilege grantors to adopt the same standards. Embodiments described herein overcome many of the disadvantages of the prior art. For example, an embodiment described herein may provide personal authentication in any number of situations and applications, including, for example, at border crossings, retail stores, banks, airports, secured locations, Internet e-commerce, etc. The biometrics may be, for example, fingerprints, retina scans, voice prints, DNA, etc.

BRIEF DESCRIPTION OF THE DRAWINGS

The foregoing, and additional objects, features and advantages will become apparent to those of skill in the art from the following detailed description of embodiments thereof, taken in conjunction with the accompanying drawings, in which.

DETAILED DESCRIPTION

Figure 1:
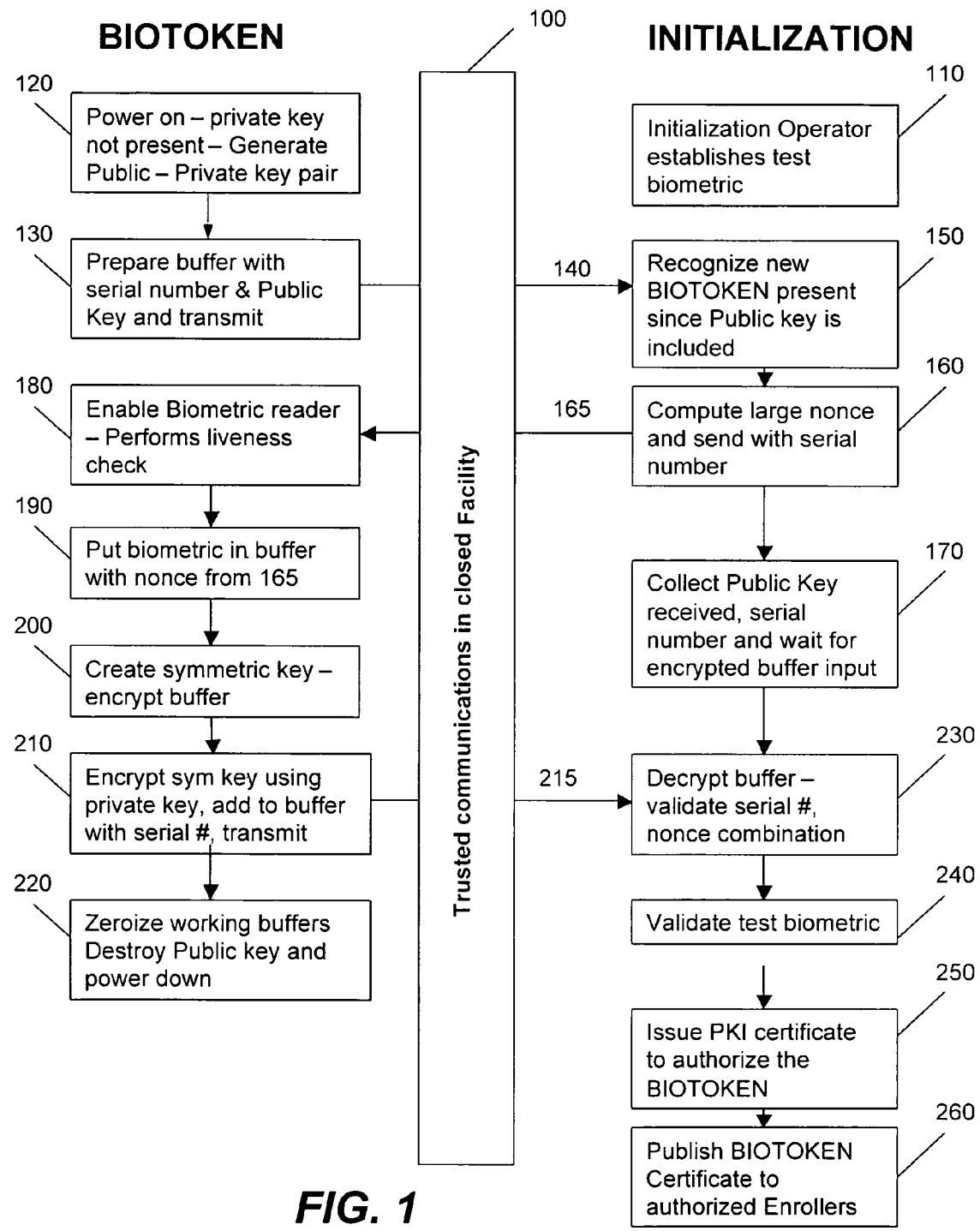
FIG. 1 is a flowchart illustrating the process for Initialization of the identity of the BIOTOKEN following manufacturing.

Turning now to a more detailed description, FIG. 1 is a block diagram illustrating the process for the establishment of the identity and the trust of a newly manufactured BIOTOKEN, in accordance with an embodiment. Communications, either wired or wireless are depicted as block 100. The communications 100 in the manufacturing process are assumed to be secure. This is necessary for the key material. As part of a batch process of initializing a production run of BIOTOKEN, the Initialization Operator establishes a test biometric(s), as shown in block 110. The use of the test biometric(s) allows the test operator to operate the BIOTOKEN in the nominal operational configuration. In so doing, the keying material, the biometric(s) reader, the communication channels, the serial number and software are tested for the BIOTOKEN. It is to be noted that the embodiments described herein can utilize any biometric, or any communication path, and are not dependent on any particular implementation of these aspects of their operation. The initialization of the BIOTOKEN is initiated by power on, as shown in block 120. During the power-on process, the internal software is validated, and the hardware goes through its internal diagnostics. Upon completion of these power-on processes, a check may be made for a valid private key. When manufactured, the secure storage of the private key contains a known null value. If a null value is detected, the BIOTOKEN generates and validates a public/private key pair. Any of the certified asymmetric algorithms can be used for the creation of this key pair.

In block 130 of FIG. 1, the BIOTOKEN prepares to announce its introduction as a newly manufactured or reset device through its communications channel 100, in accordance with an embodiment. During this process, a non-null public key is detected, because the public key was just generated. This is a flag to the BIOTOKEN software to build a transmit buffer that contains both the unique serial number of the BIOTOKEN, and a copy of the public key, if it exists. This data is transmitted at data packet 140. The initialization process accepts the transmitted packet in block 150. Since the data packet contains both a serial number and a public key, the initialization process recognizes that the BIOTOKEN is attempting to initialize itself. If the public key is not present, this is an indication that the BIOTOKEN has previously been initialized, and initialization is aborted. The BIOTOKEN has a "hard reset" mechanism that zeroizes the BIOTOKEN, in case of faulty initialization. After a "hard reset", the next power-on (block 120) will find a non-initialized BIOTOKEN, and initialization then proceeds as normal. In block 160, the initialization process computes a large random number or nonce. One purpose of the nonce is to prevent any replay attack. The sequence of communications during initialization is always known to be unique, since the nonce is never reused. The nonce and the serial number received are transmitted as packet 165 back to the BIOTOKEN. This is done to make sure that the BIOTOKEN is receiving the correct transmission. Some possible communications mechanisms operate in a "broadcast" mode. If the BIOTOKEN receives an invalid serial number in block 180, the communications is ignored. Note that the BIOTOKEN will proceed to block 220 and power-off after a preset timeout if no valid communication is received. The assumption here is that the communications channel 100 or the initialization process is not working.

In block 180, after receiving a matching unique serial number, the BIOTOKEN enables its biometric(s) reader(s), and takes a reading. There are a number of liveness checks performed to detect simulacrum(s) of the biometric(s). The liveness check algorithm applied is unique to the biometric(s) selected. The biometric may be a finger print, voice sample, retina scan, DNA sample, other biometric or any combination thereof. Once a valid biometric(s) has been read, the data is compiled into a transmit buffer as shown in block 190. The nonce received as part of message 165 is also appended to the biometric(s). This nonce will make the response unique for all possible communications, and prevents replay attacks. In block 200, the BIOTOKEN creates a symmetric key for use in one-time encryption. The symmetric algorithm used will be certified. Any of the certified encryption algorithms can be used. The serial number of the BIOTOKEN establishes the actual algorithm used. This allows the migration of the algorithm as new algorithms are certified. The symmetric key is used to encrypt the transmit buffer. The actual data encrypted is the biometric(s) and the nonce. It is important to note that various versions of the BIOTOKEN (e.g., by serial number) may use the raw biometric(s) or they may use a template conversion of the biometric(s), by choice of the different security domains. The current embodiments described herein are independent of either the biometric(s) used, or any feature extraction algorithm to be applied. In order for the receiving initialization process to be able to decrypt the data packet, the symmetric key itself may be encrypted. This is done by applying the asymmetric private key to the symmetric key in order to encrypt it. This means that only those with access to the public key may decrypt the data packet. The initialization process has this access due to message 140. The encrypted symmetric key may be added to the transmission data packet, along with the serial number of the BIOTOKEN, and that is transmitted as message 215.

Referring again to FIG. 1, the BIOTOKEN itself, having completed the transmission proceeds to block 220. There, all working buffers are zeroized. When a public key is found, that public key is destroyed to prevent access by accidental transmission or physical attack on the BIOTOKEN. Power-down occurs at this point. It is important to note that this short "burst" mode of operation allows the BIOTOKEN to operate for a very long lifetime on a very small battery, since power management is inherent to the process of the embodiments described herein.

In block 170, the initialization process has been busy staging the public key and serial number received in message 140, and the nonce sent in message 165. Upon receiving a transmission, the initialization looks for a valid serial number. If the serial number is unknown, the process assumes it has received another message 140 from a different BIOTOKEN. Multiple BIOTOKEN devices can be initialized at the same time. If the expected message 215 is not received within the known timeout window of the BIOTOKEN, the public key, nonce, and serial number are destroyed as the result of an initialization failure. Once a valid serial number is received, the public key associated with that serial number is used to decrypt the symmetric key in block 230. Once the symmetric key is decrypted, the encrypted data packet containing the nonce and biometric(s) is decrypted using the symmetric key. The computed nonce is compared to the decrypted nonce received from the BIOTOKEN. If the nonce does not agree, there has been a replay attack or a communication failure. The initialization for the particular serial number is aborted and the initialization operator is informed.

If the nonce matches, in block 240, the received biometric(s) is compared against the test biometric(s) that was established by the initialization operator in block 110. This allows a complete checkout of the biometric(s) reader, encryption/decryption, software and communications channel. In block 250, once the BIOTOKEN has completed all processing including a biometric match, the serial number of the BIOTOKEN and the public key of the BIOTOKEN are passed to an embedded PKI Certification Authority, which digitally signs a standard PKI certificate for the BIOTOKEN. In block 260, the certificate is published in a database that is only accessible to authorized Enrolling systems for the BIOTOKEN. Without access to this database, it will be impossible to enroll the BIOTOKEN, as described in FIG. 2 below.

Figure 2:
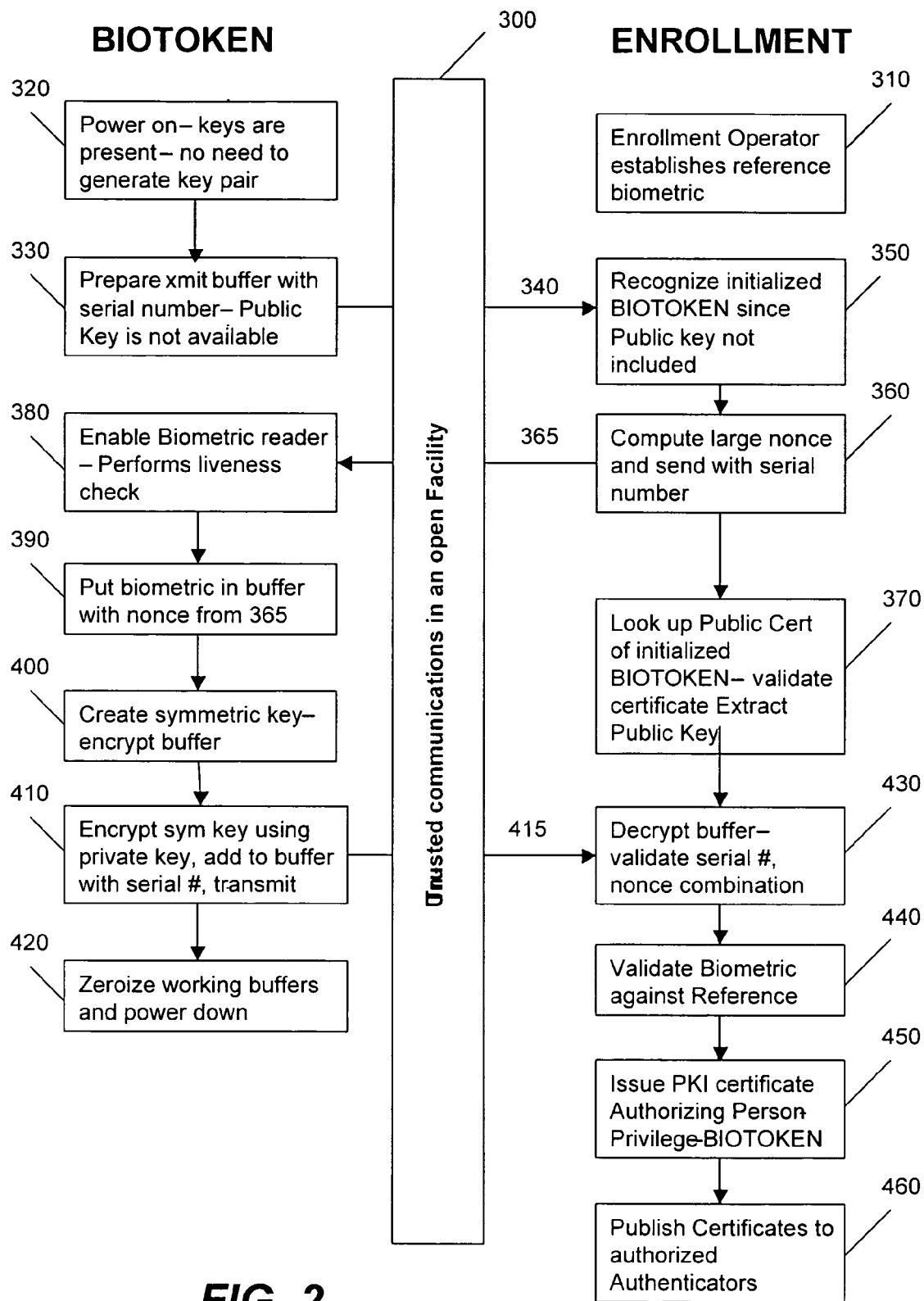
FIG. 2 is a flowchart illustrating the process in the exercise of enrolling in a secure domain.

Continuing with a more detailed description, FIG. 2 is a block diagram illustrating an embodiment of the process for the enrollment of a person identity and an initialized BIOTOKEN. This process binds a specific BIOTOKEN, an identity and/or a privilege of a person, and the biometric(s) of the person into a single BIOTOKEN capable of two-part authentication. A BIOTOKEN can be bound independently to multiple privileges or multiple persons in different domains, without loss of privacy, since nothing is ever permanently written to the BIOTOKEN by any process. No relying party knows for what other privileges the BIOTOKEN user is authorized. The lack of "write" capability is a distinguishing characteristic of the BIOTOKEN, and establishes a much higher security threshold. Communications, either wired or wireless, are depicted as block 300. The communications 300 in the enrollment process are not required to be secure, since nothing more than the serial number of the BIOTOKEN is exposed in any exploitable way. As part of the process of enrolling a person, and/or her privileges, the BIOTOKEN and the biometric(s), the enrollment operator may establish reference biometric(s) (block 310), and by extension, a reference identity. This can be done on-site by directly collecting biometric(s) and identity documentation, or via the "Secure Identity and Privilege System" method. The use of the reference biometric(s) allows the enrollment operator to operate the BIOTOKEN in the nominal operational configuration. In so doing, the keying, material, the biometric(s) reader, the communication channels, the serial number and software are tested for the BIOTOKEN.

Referring to FIG. 2, the enrollment of the BIOTOKEN is initiated by power on, as shown in block 320. During the power-on process, the internal software is validated, and the hardware goes through its internal diagnostics. Upon completion of these power-on processes, a check is made for a valid private key. If the private key exists, then the BIOTOKEN knows that it has previously been initiated (see FIG. 1). In block 330, the BIOTOKEN prepares to identify itself as a new device through its communications channel 300. During this process, a null public key is detected, because the public key was previously deleted during initialization. This is a flag to the BIOTOKEN software to build a transmit buffer that contains only the unique serial number of the BIOTOKEN. This data is transmitted at data packet 340. The enrollment process accepts the transmitted packet in block 350. Since the data packet contains both a serial number and no public key, the enrollment process recognizes that the BIOTOKEN has been previously initialized, and it should be possible to find the BIOTOKEN's public certificate within the approved initialized BIOTOKEN database. If the public key is present, this is an indication that the BIOTOKEN has not been previously initialized, and enrollment is aborted.

In block 360, the enrollment process computes a nonce. Here as previously, the purpose of the nonce is to prevent any replay attack. The sequence of communications during enrollment is always known to be unique, since the nonce is never reused. The computed nonce and the serial number received are transmitted back to the BIOTOKEN data packet 365. This is done to make sure that the BIOTOKEN is receiving the correct transmission. Some possible communications mechanisms operate in a "broadcast" mode. If the BIOTOKEN receives an invalid serial number in block 380, the communications is ignored. Note that the BIOTOKEN will proceed to block 420 and power-off after a preset timeout if no valid communication is received. The assumption here is that the communications channel 300 or the enrollment process is not working. In block 380, after receiving a matching unique serial number, the BIOTOKEN enables its biometric(s) reader(s), and takes a reading. There are a number of liveness checks performed to detect simulacrum(s) of the biometric(s). The liveness check algorithm applied may be unique to the biometric(s) selected. Once a valid biometric(s) has been read, the data is compiled into a transmit buffer as shown in block 390. The nonce received as part of message 365 is also appended to the biometric(s). This nonce will make the response unique for all possible communications, and prevents replay attacks.

In block 400, as shown in FIG. 2, the BIOTOKEN creates a symmetric key for use in one-time-encryption. The symmetric algorithm used will be certified. The symmetric key is used to encrypt the transmit buffer. The actual data encrypted is the biometric(s) and the nonce. In order for the receiving enrollment process to be able to decrypt the data packet, the symmetric key itself may be encrypted. Applying the asymmetric private key to the symmetric key does this. This means that only those with access to the public key may decrypt the data packet. The enrollment process has this access because it is able to look up the public certificate that matches the serial number of the BIOTOKEN. The encrypted symmetric key is added to the transmission data packet, along with the serial number of the BIOTOKEN, and that is transmitted as message 415. The BIOTOKEN itself, having completed the transmission proceeds to block 420. There, all working buffers are zeroized. This means that any residual biometric(s) are routinely destroyed during power-down. It is important to note that this short "burst" mode of operation allows the BIOTOKEN to operate for a very long lifetime on a very small battery, since power management is inherent to the process.

In block 370, as shown in FIG. 2, the enrollment process has caused the staging of the public key, using the serial number received in message 340 to look up the matching BIOTOKEN public certificate, and the nonce sent in message 365. Upon receiving transmission 415, the enrollment process looks for a valid serial number. If the serial number is unknown, the process assumes it has received another message 340 from a different BIOTOKEN. Multiple BIOTOKEN can be enrolled at the same time. If the expected message 415 is not received within the known timeout window of the BIOTOKEN, the public key, nonce, and serial number are destroyed as a consequence of an enrollment failure. Once a valid serial number is received (e.g., a match is detected), the public key associated with that serial number is used to decrypt the symmetric key in block 430. Once the symmetric key is decrypted, the encrypted block containing the nonce and biometric(s) is decrypted. The computed nonce is compared to the decrypted nonce received from the BIOTOKEN. If the nonce does not agree, there has been a replay attack or a communication failure. The enrollment for the particular serial number is aborted and the enrollment operator is informed.

If the nonce matches then, as shown in block 440, the received biometric(s) is compared against the reference biometric(s) that was established by the enrollment operator in block 310. This allows a complete checkout of the biometric(s) reader, encryption/decryption, software and communications channel. In block 450, once the BIOTOKEN has completed all processing, the serial number of the BIOTOKEN and the public key of the BIOTOKEN are passed to an embedded PKI Certification Authority, which digitally signs a standard PKI certificate for the BIOTOKEN. This certificate contains the BIOTOKEN serial number, the BIOTOKEN public key, the identity of the person, the privilege granted by this enrollment, and pointers to the hashed Biometric(s) used during enrollment. The privileges granted may indicate, for example, authorizations, actions, accesses or the like permitted by the associated user. In block 460, the certificate and associated biometric(s) are published in a database that is only accessible to authorized Authentication systems for the BIOTOKEN. Without access to this database, it will be impossible to authenticate the user of the BIOTOKEN, as described in FIG. 3 below.

Figure 3:
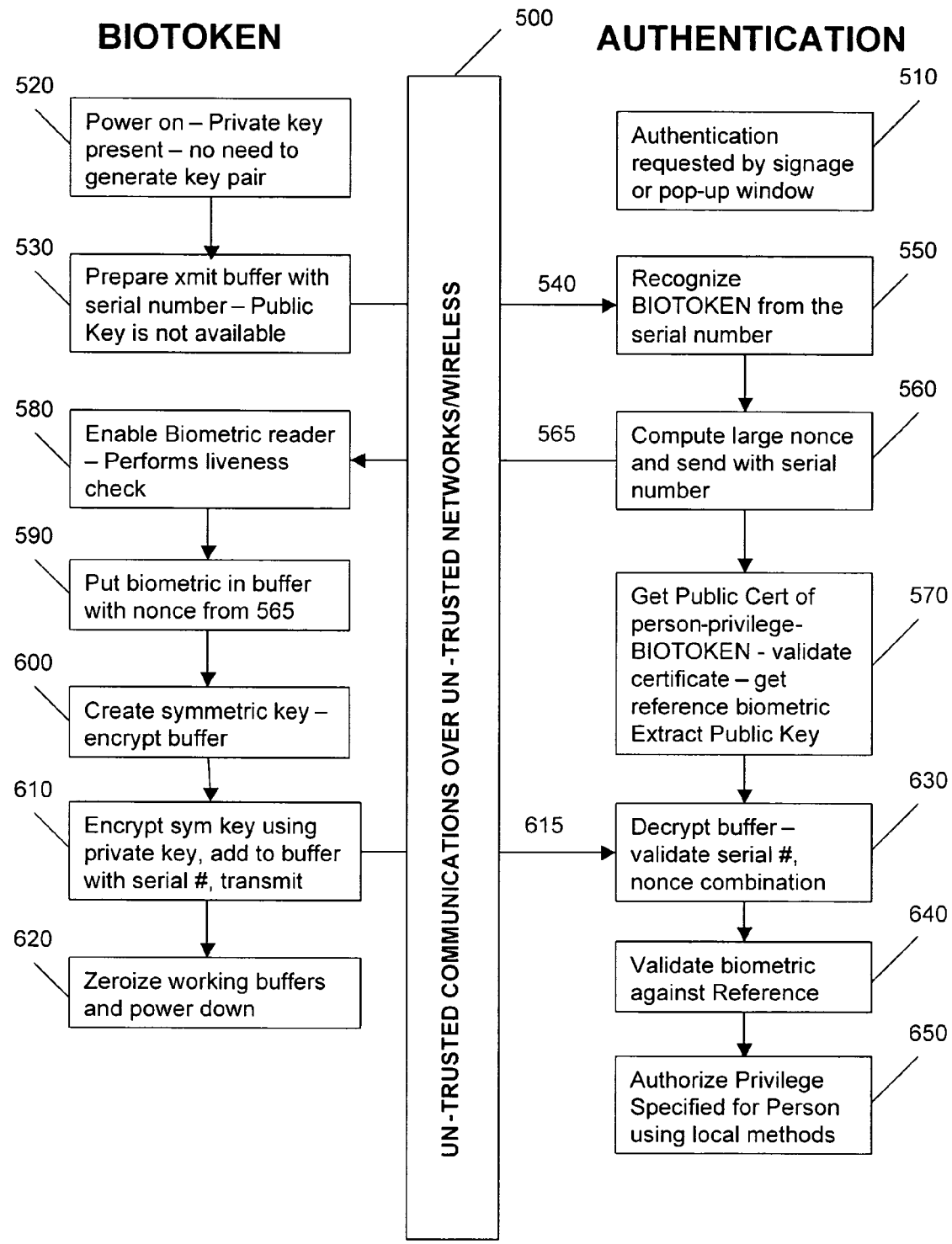
FIG. 3 is a flowchart diagram of a system for exercising remote authentication to a relying party that trusts a specific secure domain.

FIG. 3 is a block diagram illustrating an embodiment of the method for the authentication of an enrolled BIOTOKEN, when used by the person enrolled to use the BIOTOKEN (see FIG. 2). This authentication process connects a specific BIOTOKEN, an identity or a privilege of a person, and the biometric(s) of the person into a single, local or remote two-part authentication. It is a distinguishing mark of the BIOTOKEN that it is useless for any person not specifically bound to the BIOTOKEN. Even an authorized person cannot use a BIOTOKEN to which they are not bound. This segregation establishes a much higher security threshold, precipitating the reporting of a lost BIOTOKEN. A working BIOTOKEN cannot be "borrowed" from another person since the binding between the BIOTOKEN and borrowing person will fail. Communications, either wired or wireless are depicted as block 500. The communications in the authentication process are expected to be insecure, since there is no effective trust of the computing environment.

As part of the process of authenticating a person, BIOTOKEN and the biometric(s), the authenticating entity may establish reference biometric(s), and by extension, a reference identity. The authenticating entity may direct the holder of the BIOTOKEN to attempt authentication, e.g., either by signage at an access gate or via a pop-up window if done remotely across the Internet or other information network, as shown in block 510. The authentication of the BIOTOKEN and the holder is initiated by power-on, as shown in block 520. During the power-on process, the internal software of the BIOTOKEN may be validated, and the hardware may go through its internal diagnostics. Upon completion of these power-on processes, a check is made for a valid private key. If the private key exists, then the BIOTOKEN knows that it has previously been enrolled (see FIG. 2). In block 530, the BIOTOKEN prepares to announce its presence to the world through its communications channel. During this process, a null public key is detected, because the public key was previous deleted during initialization. The null public key is a flag to the BIOTOKEN software to build a transmit buffer that contains only the unique serial number of the BIOTOKEN. This data is transmitted at data packet 540. The authentication process accepts the transmitted packet in block 550. As will be described in FIG. 4, the authentication process can be performed at/on a local machine, a network server, or a global server across the Internet. Since message 540 contains only a serial number and no public key, the authentication process may recognize that the BIOTOKEN has been previously enrolled, and it should be possible to find the BIOTOKEN's public certificate within an approved enrollment BIOTOKEN database. If the public key is present, this is an indication that the BIOTOKEN has not been previously initialized, and authentication is aborted.

In block 560, the authentication process computes a nonce to prevent any replay attack. The sequence of communications during enrollment is always known to be unique, since the nonce is never reused. The nonce and the serial number received are transmitted back to the BIOTOKEN as part of message 565. This is done to make sure that the BIOTOKEN is receiving the correct transmission. Some possible communications mechanisms operate in a "broadcast" mode. If the BIOTOKEN receives an invalid serial number in data packet 580, the communications is ignored. Note that the BIOTO- KEN will proceed to block 620 and power-off after a preset timeout if no valid communication is received. The assumption here is that the communications channel or the authentication process are not working. In block 580, after receiving a matching unique serial number, the BIOTOKEN enables its biometric(s) reader(s), and takes a reading. There are a number of liveness checks performed to detect simulacrum(s) of the biometric(s). The liveness check algorithm applied is unique to the biometric(s) selected. Once a valid biometric(s) has been read, the data is compiled into a transmit buffer as shown in block 590. The nonce received as part of message 565 is also appended to the biometric(s). This nonce will make the response unique for all possible communications, and prevents replay attacks. In block 600, the BIOTOKEN creates a symmetric key for use in one-time encryption. The symmetric algorithm used will be certified. The symmetric key is used to encrypt the transmit buffer. The actual data encrypted is the biometric(s) and the nonce. In order for the receiving authentication process to be able to decrypt the data packet, the symmetric key itself may be encrypted. Applying the asymmetric private key to the symmetric key does this. This means that only those with access to the public key may decrypt the data packet. The authentication process has this access because it is able to look up the public certificate generated during enrollment that matches the serial number of the BIOTOKEN, as shown in block 570. The encrypted Symmetric key is added to the transmission data packet, along with the serial number of the BIOTOKEN, and that is transmitted as message 615. The BIOTOKEN itself, having completed the transmission proceeds to block 620. There, all working buffers are zeroized. This means that any residual biometric(s) are routinely destroyed during Power-down. It is important to note that this short "burst" mode of operation allows the BIOTOKEN to operate for a very long lifetime on a very small battery, since power management is inherent to the process.

In block 570, the authentication process has served the purpose of staging the public key, using the serial number received in message 540 to look up the matching BIOTOKEN public certificate, and the nonce sent in message 565. Upon receiving transmission 615, the authentication process looks for a valid serial number. If the serial number is unknown, the process assumes it has received another message 540 from a different BIOTOKEN. Multiple BIOTOKEN can be authenticating at the same time. If the expected message 615 is not received within the known timeout window of the BIOTOKEN, the public key, nonce, and serial number are destroyed as a consequence of an authentication failure. Once a valid serial number is received, the public key associated with that serial number is used to decrypt the symmetric key in block 630. Once the symmetric key is decrypted, the encrypted data packet containing the nonce and biometric(s) is decrypted. The computed nonce is compared to the decrypted nonce received from the BIOTOKEN. If the nonce does not agree, there has been a replay attack or a communication failure. The authentication for the particular serial number is aborted and the authentication entity denies access.

If the nonce matches then, as shown in block 640, the received biometric(s) is compared against the reference biometric(s) that was established by the enrollment processes in FIG. 2. In block 650, once the BIOTOKEN has completed all processing and all checks are complete, the person holding the BIOTOKEN is authorized. Various methods are used to maintain the access session, such as a Kerberos ticket, Virtual Private Network, session key, etc. These methods are many, and they can be used by the embodiments described herein.

Figure 4:
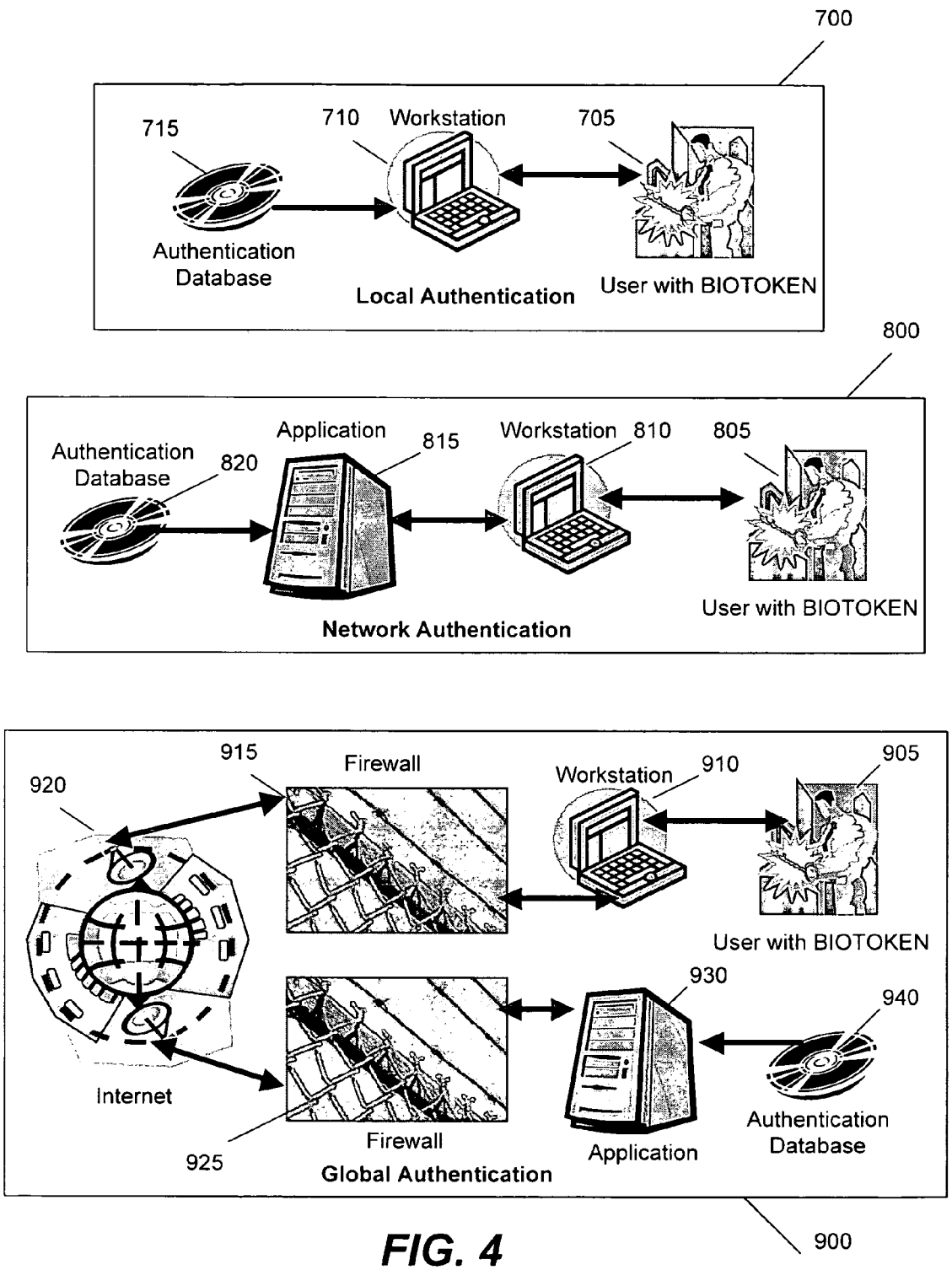
FIG. 4 is a block diagram showing example use of the BIOTOKEN to establish authentication, in the cases of a local machine environment, a networked environment, and a global environment.

FIG. 4 is intended to show samples of usage of the embodiments described herein. The first of these is local authentication, as shown in block 700. A local machine (e.g., workstation 710), if it has access to the public certificate for an enrolled BIOTOKEN and the biometric(s) of the person bound to the certificate, may use the BIOTOKEN to replace any or all authentication on the local workstation. Following the method shown in FIG. 3, for example, the machine would replace the ctrl-alt-delete popup (on windows), with signage requiring a logon. The user with the BIOTOKEN 705 would turn on their BIOTOKEN, which would send the BIOTOKEN serial number via wired or wireless communications. If the certificate of the BIOTOKEN can be located on the workstation 710, a serial number and nonce is sent back to the BIOTOKEN 705. The BIOTOKEN 705 reads the biometric(s), encrypts the biometric(s) and nonce, and returns the encrypted data along with an encrypted symmetric key and serial number. The logon function decrypts the symmetric key using the public key of the BIOTOKEN certificate, decrypts the biometric(s) and nonce, validates the nonce, and validates the biometric(s) against the reference in the authentication database 715. Access is granted to the workstation 710.

Authentication at a remote application on the network is shown in block 800 of FIG. 4. Network authentication may follow the exact process as in local authentication shown in block 700. With respect to network authentication, the application server 815 pops an authentication window. In this mode, the workstation 810 is merely passing information between the application server 815 and the BIOTOKEN 805. The workstation 810 has no access to the data being sent. The application 815 does the decryption and biometric(s) validation using its local authentication database 820. If validation occurs, access to the workstation 810 is granted.

Global authentication, in accordance with an embodiment, is shown in FIG. 4 at block 900. In the Global Authentication example, the application server 930 is located inside the remote firewall 925, and communicates through the Internet 920, while the holder of the BIOTOKEN 915 is protected by his local firewall 915. The application could be a web server, a database server, or any application (e.g., banking or medical related applications) requiring strong two-part authentication. The authentication database may be held by the remote authentication database 940. Nothing of value, including the biometric(s) are exposed anywhere along the chain. In this embodiment, the application 930 does the decryption and biometric(s) validation using the authentication database 940. If validation occurs, workstation 910 is granted access to the remote application.

Figure 5:
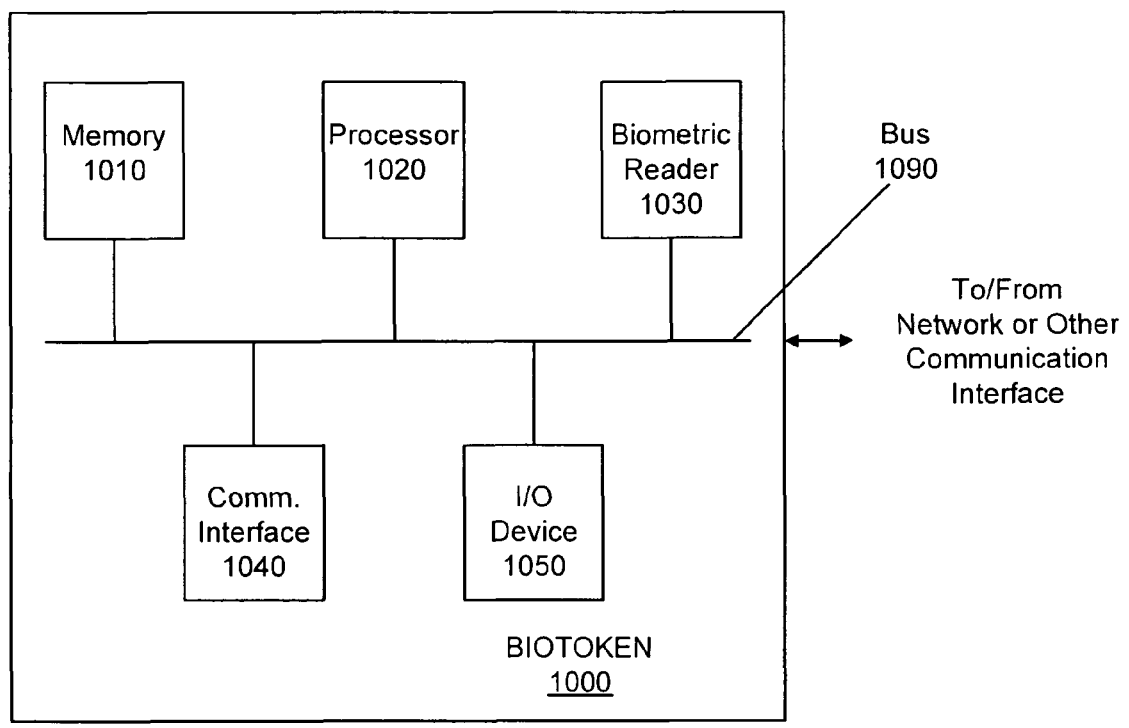
FIG. 5 is a block diagram of a BIOTOKEN in accordance with an embodiment of the present invention.

FIG. 5 is a block diagram of a BIOTOKEN 1000 in accordance with an embodiment of the present invention. The BIOTOKEN 1000 may be embodied in a smart card, a PDA (Personal Digital Assistant), a computer, a remote control, a phone and or any other device or card. The BIOTOKEN 1000 may include one or more of the following components: a memory 1010, a processor 1020, a biometric reader 1030, a communication interface 1040, an I/O (input/output) interface 1050. The various components may be coupled to each other via a communications bus 1090. The BIOTOKEN 1000 may include additional components.

The memory 1010 is be coupled to the processor 1020 and can store instructions adapted to be executed by processor 1020 according to one or more actions or methods associated with the BIOTOKEN as shown in FIGS. 1-4 and as described herein. Memory 1010 can be any storage device capable of storing analog or digital information, such as a hard disk, Random Access Memory (RAM), Read Only Memory (ROM), flash memory, a compact disk, a magnetic tape, a floppy disk, and/or any combination thereof. In an embodiment, the BIOTOKEN 1010 may access remote memory.

The processor 1020 may be a general-purpose microprocessor or may be an Application Specific Integrated Circuit (ASIC), which has been designed to implement in its hardware and/or firmware at least a part of a method in accordance with an embodiment of the present invention. The processor 1020 may include any software to process instructions to, for example, initialize, enroll, authenticate, test and/or use the BIOTOKEN 1000.

In an embodiment, the BIOTOKEN 1000 may include an internal or external biometric reader 1030. The biometric reader may be, e.g., a finger print analyzer, a voice print analyzer, a retina scanner, a DNA analyzer and/or any combination thereof. The biometric reader 1030 may be any device which collects biometric data from the user. The biometric data may be, e.g., finger print data, voice data, a retina scan, DNA sample, or other biometric data and/or any combination thereof. The biometric reader 1030 may collect and process any biometric data from the user. The collected data may be passed to the memory 1010 or other secure memory for storage. The collected or stored biometric data may be encrypted. In an alternative embodiment, the collected biometric data may be provided to the processor 1020 for processing. In an embodiment, to prevent unauthorized use of the BIOTOKEN, the biometric data may be immediately destroyed after it is used in accordance with an embodiment.

The communication interface 1040 may be any type of wireless and/or wired interface. The interface 1040 can be a telephone interface, a traditional data modem, a fax modem, a cable modem, a digital subscriber line interface, a bridge, a hub, a router, a wireless or WiFi card, a USB (Universal Serial Bus) interface, a Bluetooth® interface, or other similar devices.

The communication interface 1040 may provide an external connection to another device or to a private or public network. The network may be a communications network that may include, for example, a public switched telephone network (PSTN), an Integrated Services Digital Network (ISDN), a cellular network, a digital mobile network, a Personal Communication Systems (PCS) network, an Internet, an intranet, a signaling system 7 (SS7) network, a local area network (LAN), a satellite network, an advance intelligent network (AIN), any suitable digital or analog network, a broadband network such as a cable network, any other suitable national and/or international communications network or any suitable combination thereof. The network may be a short range or long range wireless network. The BIOTOKEN may be Bluetooth® enabled to permit the BIOTOKEN to communicate with other devices.

The BIOTOKEN may include an I/O (Input/Output) device 1050 which may be an audio and/or visual device, including, for example, a monitor, display, keyboard, keypad, touch-pad, pointing device, microphone, speaker, video camera, camera, scanner, and/or printer, including a port to which an I/O device can be attached or connected. The BIOTOKEN may include an I/O interface to permit additional devices such an external biometric readers, external memory, external I/O devices, etc. to be connected to the BIOTOKEN.

Although the embodiments herein have been described in terms of preferred embodiments, it will be apparent to those of skill in the art that numerous modifications may be made without departing from the true spirit and scope of the invention. For example, the system diagrams show that the symmetric key is generated on the BIOTOKEN, and encrypted using the private key of the BIOTOKEN, then decrypted on using the public key of the BIOTOKEN at the point of reception. An alternate approach is to generate the symmetric key at the point that wishes to validate the BIOTOKEN. That point could then encrypt the symmetric key using the public certificate of the BIOTOKEN. Only the BIOTOKEN could decrypt the symmetric key and then use it to return the symmetrically encrypted biometric(s). Additionally, any insecure or secure method of communication, wired or wireless may be used to communicate between the BIOTOKEN and the Initialization, Enrollment and Authentication points. Such minor modifications can be made without departing from the true spirit and scope of these following claims.

What is claimed is:

1. A method for utilizing a BIOTOKEN, wherein the BIOTOKEN includes a processor, biometric reader, a memory, and a communications interface, for secure identification comprising:

upon detecting a null value in a secure storage of private keys, generating and validating a public/private asymmetric key pair containing a public key and a private key;

transmitting the public key and a unique serial number of the BIOTOKEN to an initialization point when the private key is detected in the memory at power up of the BIOTOKEN;

collecting biometric data from a user;

temporarily storing the biometric data in the memory on the BIOTOKEN;

creating a first data packet including a random number and the collected biometric data;

encrypting the first data packet using a symmetric key;

encrypting the symmetric key using the private key so that the first data packet can be decrypted only by the public key;

creating a second data packet including the encrypted first data packet, the encrypted symmetric key and the unique serial number;

issuing a public certificate containing the unique serial number of the BIOTOKEN;

transmitting the second data packet to the initialization point;

immediately deleting the biometric data and the public key from the memory after transmission so that the biometric data and the public key do not remain on the BIOTOKEN after initialization; and during enrollment, cryptographically binding the unique serial number, the biometrics and the public certificate.

2. The method of claim 1, further comprising:

receiving the random number from the initialization point.

3. The method of claim 1, wherein the received serial number is transmitted from the initialization point.

4. The method of claim 1, further comprising:

comparing the received serial number with the unique serial number;

if the received serial number does not match the unique serial number, clearing all memory locations storing at least one of the first data packet and the second data packet.

5. The method of claim 1, wherein the collecting biometric data comprises one or more of the following from the user:

collecting a voice print from the user;

collecting a finger print from the user;

scanning the user's retina; or collecting a DNA sample from the user.

6. The method of claim 1, further comprising:
clearing all memory locations storing at least one of the first data packet and the second data packet after the second data packet is transmitted to the initialization point.

7. The method of claim 1, further comprising:
generating the symmetric key at the BIOTOKEN.

8. A method for initializing a BIOTOKEN, wherein the BIOTOKEN includes a processor, a biometric reader, a memory, and a communications interface, comprising:
generating a private key and a public key when a null private key is detected after powering up the BIOTOKEN;
storing the private key in the memory;
transmitting a unique serial number associated with the BIOTOKEN and the public key to an initialization point;
collecting biometric data from a user;
temporarily storing the biometric data in the memory on the BIOTOKEN;
creating a first data packet including a random number and the collected biometric data;
encrypting the first data packet using a symmetric key;
encrypting the symmetric key using the private key so that the first data packet can be decrypted only by the public key;
creating a second data packet including the encrypted first data packet, the encrypted symmetric key and the unique serial number;
transmitting the second data packet to the initialization point; and
immediately deleting the biometric data and the public key from the memory after transmission so that the biometric data and the public key do not remain on the BIOTOKEN after initialization.

9. The method of claim 8, further comprising:
receiving the random number from the initialization point.

10. The method of claim 8, wherein the received serial number is transmitted from the initialization point.

11. The method of claim 8, further comprising:
comparing the received serial number with the unique serial number;
if the received serial number does not match the unique serial number, clearing all memory locations storing at least one of the first data packet and the second data packet.

12. The method of claim 8, wherein the collecting biometric data comprises one or more of the following from the user:
collecting a voice print from the user;
collecting a finger print from the user;
scanning the user's retina; or
collecting a DNA sample from the user.

13. The method of claim 8, further comprising:
clearing all memory locations storing at least one of the first data packet and the second data packet after the second data packet is transmitted to the initialization point.

14. A method for initializing a BIOTOKEN at an initialization point, the method comprising:
receiving a public key and a unique serial number from a BIOTOKEN, wherein the BIOTOKEN includes a processor, a biometric reader, a memory, and a communications interface, wherein an encrypted biometric data associated with a user can only be decrypted using the public key;
generating a random number;
transmitting the random number and the unique serial number to the BIOTOKEN;
comparing a serial number received from the BIOTOKEN with the unique serial number, and when there is a match,
decrypting an encrypted symmetric key that is encrypted by a private key and transmitted by the BIOTOKEN using the public key; and
decrypting an encrypted random number and the encrypted biometric data using the decrypted symmetric key;
comparing the decrypted random number with the transmitted random number at the initialization point and, when there is a match, validating the decrypted biometric data;
issuing a public certificate containing the unique serial number of the BIOTOKEN;
transmitting the received serial number and the public key to a certification authority when the biometric data is validated; and
immediately deleting the biometric data and the public key from the memory after transmission so that the biometric data and the public key do not remain on the BIOTOKEN after initialization; and
during enrollment, cryptographically binding the unique serial number, the biometrics and the public certificate.

15. The method of claim 14, further comprising:
issuing an authentication certificate associated with the BIOTOKEN by the certification authority.

16. The method of claim 14, further comprising:
publishing the authentication certificate in a database, wherein the database is only accessible by authorized parties.

17. The method of claim 14, wherein validating the decrypted biometric data comprises:
comparing the decrypted biometric data associated with the user with a test biometric data associated with a BIOTOKEN owner.

18. The method of claim 14, wherein the user is an authorized user of the BIOTOKEN.

19. The method of claim 14, further comprising:
establishing test biometric data associated with a BIOTOKEN owner.

20. The method of claim 14, further comprising:
aborting the initialization method if one or more of the following are true:
the received serial number does not match the unique serial number;
the received serial number does not match the unique serial number within a predetermined period of time;
the decrypted random number does not match the transmitted random number; or
the decrypted random number does not match the transmitted random number within a predetermined period of time.

21. The method of claim 14, further comprising:
destroying one or more of the following if the received serial number does not match the unique serial number:
the public key, the decrypted random number, the generated random number or the decrypted biometric information.

22. The method of claim 14, further comprising:
destroying one or more of the following if the decrypted random number does not match the transmitted random number:
the public key, the decrypted random number, the generated random number of the decrypted biometric information.

23. A method for enrolling a BIOTOKEN, the method comprising:
   receiving a unique serial number from a BIOTOKEN, wherein the BIOTOKEN includes a processor, a biometric reader, a memory, and a communications interface;
   generating random number;
   transmitting the random number and the unique serial number to the BIOTOKEN;
   retrieving a public key and an authentication certificate associated with the BIOTOKEN based on the unique serial number, wherein an encrypted biometric data associated with a user can only be decrypted using the public key;
   comparing a serial number received from the BIOTOKEN with the unique serial number, and when there is a match,
      decrypting an encrypted symmetric key that is encrypted by a private key and transmitted by the BIOTOKEN using the public key;
      decrypting an encrypted random number and the encrypted biometric data using the decrypted symmetric key;
   comparing the decrypted random number with the transmitted random number at an enrolling point and, when there is a match, validating the decrypted biometric data;
   transmitting the received serial number and the public key to a certification authority when the biometric data is validated; and
   immediately deleting the biometric data and the public key from the memory after transmission so that the biometric data and the public key do not remain on the BIOTOKEN.

24. The method of claim 23, further comprising:
   issuing an authentication certificate associated with the BIOTOKEN by the certification authority, wherein the authentication certificate contains the received serial number, the public key, identity data for the user and a set of privileges granted to the user of the BIOTOKEN.

25. The method of claim 24, further comprising:
   publishing the authentication certificate and the decrypted biometric data associated with the user in a database, wherein the database is only accessible by authorized parties.

26. The method of claim 23, further comprising:
   establishing reference biometric data associated with a BIOTOKEN owner.

27. The method of claim 26, wherein the validating the decrypted biometric data comprises:
   comparing the decrypted biometric data associated with the user with the reference biometric data associated with a BIOTOKEN owner.

28. The method of claim 23, further comprising:
   aborting the enrollment method if one or more of the following is true:
      a public key is received from the BIOTOKEN;
      the received serial number does not match the unique serial number;
      the received serial number does not match the unique serial within a predetermined period of time;
      the decrypted random number does not match the transmitted random number; or
      the decrypted random number does not match the transmitted random number within a predetermined period of time.

29. The method of claim 23, within the user is an authorized user of the BIOTOKEN.

30. The method of claim 23, further comprising:
   destroying one or more of the following if the received serial number does not match the unique serial number:
      the public key, the decrypted random number, the generated random number or the decrypted biometric information.

31. The method of claim 23, further comprising:
   destroying one or more of the following if the decrypted random number does not match the transmitted random number:
      the public key, the decrypted random number, the generated random number of the decrypted biometric information.

32. A method for authenticating a BIOTOKEN, the method comprising:
   receiving a unique serial number from a BIOTOKEN, wherein the BIOTOKEN includes a processor, a biometric reader, a memory, and a communications interface, wherein an encrypted biometric data associated with a user can only be decrypted using the public key;
   generating a random number;
   transmitting the random number and the unique serial number to the BIOTOKEN;
   retrieving a public key and a authentication certificate associated with the BIOTOKEN based on the unique serial number;
   comparing a serial number received from the BIOTOKEN with the unique serial number, and when there is a match,
      decrypting an encrypted symmetric key that is encrypted by a private key and transmitted by the BIOTOKEN using the public key; and
      decrypting an encrypted random number and the encrypted biometric data using the decrypted symmetric key;
   comparing the decrypted random number with the transmitted random number at an authentication point and, when there is a match, comparing the decrypted biometric data with reference biometric data;
   authenticating the user of the BIOTOKEN when the decrypted biometric data matches the reference biometric data; and
   immediately deleting the biometric data and the public key from the memory after transmission so that the biometric data and the public key do not remain on the BIOTOKEN.

33. The method of claim 32, further comprising:
   establishing reference biometric data associated with a BIOTOKEN owner.

34. The method of claim 32, further comprising:
   a public key is received from the BIOTOKEN;
   the received serial number does not match the unique serial number;
   the received serial number does not match the unique umber within a predetermined period of time;
   the decrypted random number does not match the transmitted random number; or
   the decrypted random number does not match the transmitted random number within a predetermined period of time.

35. The method of claim 32, further comprising:
   destroying one or of the following if the received serial number does not match the unique serial number:
      the public key, the decrypted random number, the generated random number of the decrypted biometric information.

36. The method of claim 32, further comprising:
destroying one or more of the following if the decrypted random number does not match the transmitted random number:
the public key, the decrypted random number, the generated random number or the decrypted biometric information.

37. A BIOTOKEN comprising:
a processor;
a biometric reader;
a communications interface; and
a memory, wherein the memory stores a plurality of executable instructions to be executed by the processor to implement a method comprising:
transmitting by the communications interface, a unique serial number associated with the BIOTOKEN, to an initialization point when a private key is detected in the memory at power up of the BIOTOKEN;
collecting biometric data from a user at the biometric reader;
temporarily storing the biometric data in the memory on the BIOTOKEN;
creating a first data packet including a random number and the collected biometric data;
encrypting the first data packet using a symmetric key;
encrypting the symmetric key using the private key;
creating a second data packet including the encrypted first data packet, the encrypted symmetric key and a received serial number;
transmitting the second data packet to the initialization point; and
immediately deleting the biometric data from the memory after decryption of the symmetric key so that the biometric data does not remain on the BIOTOKEN.

38. The BIOTOKEN of claim 37, wherein the biometric reader is one or more of a fingerprint reader, a retina scanner, a voice analyzer or a DNA analyzer.

39. The BIOTOKEN of claim 37, wherein the memory stores additional executable instructions to generate a public key and the private key on the BIOTOKEN if a private key is not detected at power up.

40. The BIOTOKEN of claim 39, wherein the communications interface transmits the public key with the unique serial number from the BIOTOKEN to the initialization point.

41. The BIOTOKEN of claim 37, wherein the communications interface receives the random number from the initialization point.

42. The BIOTOKEN of claim 37, wherein the processor compares the received serial number with the unique serial number and if the received serial number does not match the unique serial number, clears all memory locations in the memory storing at least one of the first data packet and the second data packet.

* * * * *